3,796,803
3,3-DIMETHYL-2-NORBORNANE DERIVATIVES
USED AS FUNGICIDES
Jerry Glenn Strong, Fanwood, N.J., assignor to
Mobil Oil Corporation
No Drawing. Continuation-in-part of abandoned application Ser. No. 126,960, Mar. 22, 1971. This application July 10, 1972, Ser. No. 270,424
Int. Cl. A01n 9/00, 9/20, 9/24
U.S. Cl. 424—316    10 Claims

ABSTRACT OF THE DISCLOSURE

Certain 3,3-dimethyl-2-norbornane derivatives form a new class of soil fungicides.

CROSS-REFERENCE TO RELATED APPLICATIONS

This application is a continuation-in-part of copending application Ser. No. 126,960, filed Mar. 22, 1971 and now abandoned.

BACKGROUND OF THE INVENTION

Field of the invention

This invention is directed to the use of a defined group of 3,3-dimethyl-2-norbornane derivatives as fungicides, certain of which derivatives are novel compounds.

DESCRIPTION OF THE PRIOR ART 3,3-dimethyl-2-norbornaneacetic acid, the ethyl ester thereof and 3,3-dimethyl-2-norbornaneethanol are known compounds, but their use as pesticides has not been specified (K. Suga and S. Watanabe, Aust. J. Chem., 20, 2033 (1967)).

3,3-dimethyl-2-norbornaneacetaldehyde, a useful starting material in the synthesis of the compounds of the present invention, is disclosed in Germany Patent Numbers 923,918 and 1,117,244.

SUMMARY OF THE INVENTION

This invention provides a method for combatting fungi which comprises contacting the fungi with at least one compound selected from the group consisting of (1) a compound of the formula:

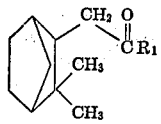

and (2) a compound of the formula:

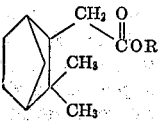

wherein $R_1$ is a member selected from the group consisting of hydrogen, halogen (e.g., fluorine, chlorine and bromine), hydroxy, alkoxy of 1–8 carbon atoms, substituted alkoxy of 1–8 carbon atoms, aryloxy, phenoxy, substituted phenoxy, mercapto, alkylmercapto of 1–6 carbon atoms, alkylamino of 1–12 carbon atoms, dialkylamino of 2–12 carbon atoms, morpholino, anilino, substituted anilino, arylamino, substituted arylamino, diarylamino, alkylarylamino, acyloxy, aroyloxy and alkyl of 1–6 carbon atoms, and $R_2$ is a member selected from the group consisting of monovalent inorganic ions (e.g., Li+, Na+, and K+), divalent inorganic ions (e.g., Ca++, Ba++, Zn++, Cu++, Sn++, Co++, and Pb++) and monovalent ammonium ions of the formula: $NR_3R_4R_5R_6$ wherein $R_3$, $R_4$, $R_5$ and $R_6$ are members selected from the group consisting of hydrogen, alkyl of 1–6 carbon atoms and aryl and (3) 3,3-dimethyl-2-norbornanethanol; and fungicidal compositions comprising at least one such compound and a carrier therefor.

This invention further provides novel compounds having the above formulae, wherein $R_1$ is a member selected from the group consisting of halogen (e.g., fluorine, chlorine and bromine), alkoxy of 3–8 carbon atoms, substituted alkoxy of 3–8 carbon atoms, aryloxy, phenoxy, substituted phenoxy, mercapto, alkylmercapto of 1–6 carbon atoms, alkylamino of 1–12 carbon atoms, dialkylamino of 2–12 carbon atoms, morpholino, anilino, substituted anilino, arylamino, substituted arylamino, diarylamino, alkylarylamino, acyloxy and aroyloxy, and wherein $R_2$ is a member selected from the group consisting of monovalent inorganic ions (e.g., Li+, Na+ and K+), divalent inorganic ions (e.g., Ca++, Ba++, Zn++, Cu++, Sn++, Co++, and Pb++) and monovalent ammonium ions of the formula: $NR_3R_4R_5R_6$ wherein $R_3$, $R_4$, $R_5$ and $R_6$ are members selected from the group consisting of hydrogen, alkyl of 1–6 carbon atoms and aryl.

DESCRIPTION OF SPECIFIC EMBODIMENTS

As will be noted from the above formulae, the compounds for use as fungicides in the present invention are certain 3,3-dimethyl-2-norbornane derivatives. Nonlimiting examples of the compounds useful for combatting fungi in accordance with this invention include:

3,3-dimethyl-2-norbornaneacetic acid, ethyl ester;
3,3-dimethyl-2-norbornaneacetic acid, methyl ester;
3,3-dimethyl-2-norbornaneacetic acid, cyclohexyl ester;
3,3-dimethyl-2-norbornaneacetic acid, isopropyl ester;
3,3-dimethyl-2-norbornaneacetic acid, cyclopropyl ester;
3,3-dimethyl-2-norbornaneacetyl chloride;
3,3-dimethyl-2-norbornaneacetyl bromide;
3,3-dimethyl-2-norbornaneacetaldehyde;
3,3-dimethyl-2-norbornaneacetic acid, phenyl ester;
3,3-dimethyl-2-norbornaneacetic acid, p-chlorophenyl ester;
3,3-dimethyl-2-norbornaneacetic acid, p-nitrophenyl ester;
3,3-dimethyl-2-norbornaneacetic acid, O-methylphenyl ester;
3,3-dimethyl-2-norbornaneacetic acid, m-trifluoromethylphenyl ester;
3,3-dimethyl-2-norbornanethioacetic acid;
3,3-dimethyl-2-norbornanethioacetic acid, methyl ester;
3,3-dimethyl-2-norbornaneacetic acid, N-methyl amide
3,3-dimethyl-2-norbornaneacetic acid, N,N-dimethyl amide
3,3-dimethyl-2-norbornaneacetic acid, N-methyl-N-ethyl amide
3,3-dimethyl-2-norbornaneacetic acid, N-propyl amide;
3,3-dimethyl-2-norbornaneacetic acid, N-phenyl amide;
3,3-dimethyl-2-norbornaneacetic acid, N-(p-chlorophenyl)amide;
3,3-dimethyl-2-norbornaneacetic acid, N-(3,4-dichlorophenyl)amide;
3,3-dimethyl-2-norbornaneacetic acid, N-(3-trifluoromethylphenyl)amide;
3,3-dimethyl-2-norbornaneacetic acid, N-(4-nitrophenyl)amide;
3,3-dimethyl-2-norbornaneacetic acid, N-phenyl-N-methyl amide;
3,3-dimethyl-2-norbornaneacetic acid, N-(4-chlorophenyl)-N-methyl amide;
3,3-dimethyl-2-norbornaneacetic acid, N-(3,4-dichlorophenyl)-N-methyl amide;
3-(3,3-dimethyl-2-norbornyl)-2-propanone;
4-(3,3-dimethyl-2-norbornyl)-3-butanone;
5-(3,3-dimethyl-2-norbornyl)-4-pentanone;
3,3-dimethyl-2-norbornaneacetic acid, sodium salt;
3,3-dimethyl-2-norbornaneacetic acid, potassium salt;

3,3-dimethyl-2-norbornaneacetic acid, zinc salt;
3,3-dimethyl-2-norbornaneacetic acid, cupric salt;
3,3-dimethyl-2-norbornaneacetic acid, stannous salt;
3,3-dimethyl-2-norbornaneacetic acid, lead salt;
3,3-dimethyl-2-norbornaneacetic acid, ammonium salt;
3,3-dimethyl-2-norbornaneacetic acid, dimethylammonium salt;
3,3-dimethyl-2-norbornaneacetic acid, tetramethylammonium salt;
3,3-dimethyl-2-norbornaneacetic acid, N-methyl-N-phenylammonium salt;
3,3-dimethyl-2-norbornaneacetic acid anhydride;
3,3-dimethyl-2-norbornaneacetic acid, acetic acid anhydride;
3,3-dimethyl-2-norbornaneacetic acid, propionic acid anhydride;
3,3-dimethyl-2-norbornaneacetic acid, benzoic acid anhydride;
3,3-dimethyl-2-norbornaneacetic acid, napthoic acid anhydride;
3,3-dimethyl-2-norbornaneacetic acid, 2-octyl ester;
3,3-dimethyl-2-norbornaneacetic acid, 2-chloroethyl ester;
3,3-dimethyl-2-norbornaneacetic acid, 2,4-dichlorophenyl ester;
3,3-dimethyl-2-norbornaneacetic acid, N-dodecyl amide;
3,3-dimethyl-2-norbornaneacetic acid, 3,4-dimethylphenyl amide;
3,3-dimethyl-2-norbornaneacetyl fluoride;
3,5-dimethyl-4-(3,3-dimethyl-2-norbornylacetyl)-morpholine;
3,3-dimethyl-2-norbornaneacetic acid, propargyl ester;
3,3-dimethyl-2-norbornaneacetic acid, propargyl amide.

The compounds for use in this invention which are known, i.e., those in which $R_1$ is hydrogen, hydroxy or ethoxy, may be prepared according to the hereinbefore cited art.

The compounds for use in this invention which are novel may be prepared according to the following general procedure.

3,3-dimethyl-2-norbornaneacetic acid is refluxed with excess halogenating agent, such as, for example, phosgene, thionyl fluoride, thionyl chloride, or thionyl bromide, in a solvent, if desired, such as, for example, benzene, ethyl ether, or toluene. Excess halogenating agent and solvent, if used, are then removed by, for example, evaporation to yield a 3,3-dimethyl-2-norbornaneacetyl halide which is then (1) used an active compound of this invention (i.e., wherein $R_1$ is halogen) or (2) mixed with a fresh solvent, if desired.

To the intermediary acetyl halide compound is added any suitable reactant, such as, for example, ammonia, amines (primary, secondary, tertiary), alcohols, substituted alcohols, anilines (substituted or unsubstituted), mercaptans, phenols (substituted or unsubstituted), carboxylic acids or aqueous solutions or inorganic monovalent or divalent ions or organic ammonium ions, and an acid accepting agent such as, for example, a trialkylamine or pyridine. The resulting mixture is stirred, and heated, if desired, washed with water, if desired, filtered, dried and evaporated to yield the desired product.

The following specific examples demonstrate the typical procedure:

EXAMPLE 1

3,3-dimethyl-2-norbornaneacetic acid

A 55.3 g. (0.35 mole) sample of potassium permanganate was added portionwise over 2 hours to a stirred, cooled (10–15° C.) mixture of 83 g. (0.5 mole) of 3,3-dimethyl-2-norbornaneacetaldehyde and 107 g. of 96% sulfuric acid in 500 ml. of distilled water. The resulting reaction mixture was stirred at room temperature for 2 hours and then cooled to 10° C. Sufficient sodium bisulfite was added to reduce the precipitated manganese oxide and the resulting colorless, two-phase mixture was extracted with ethyl ether. The organic layer was extracted with 10% sodium hydroxide and the aqueous solution was washed with ethyl ether, neutralized with 36% hydrochloric acid and extracted with ethyl ether. The ethereal solution was dried over magnesium sulfate and concentrated to afford 53.4 g. of pure 3,3-dimethyl-2-norbornaneacetic acid as a solid, with a melting point of 50–55° C.

IR analysis.—($\tau_{max.}$ film) 3.45(s), 5.9(s), 7.1 (m), 7.75(s), 10.7(m) microns.

NMR analysis.—($\delta$ CDC13) 1179(1H,s), 2.5 to 0.77 (17H,m) p.p.m.

MS analysis.—(molecular ion) 182.

In illustration of this invention, the 3,3-dimethyl-2-norbornaneacetic acid was subjected to the following fungicidal tests. The results of said tests are set forth following the test description.

Fungicide testing method

Four representative soil fungi *Fusarium oxysporium*, *Pythium debaryanum*, *Rhizoctonia solani* and *Sclerotium rolfsii*, are maintained on potato dextrose agar in 20 x 150 mm. test tubes. Inoculum for the test is increased in a 1000 ml. Erlenmeyer flask on a ¼ corn meal-¾ sand mixture (by volume). The medium is saturated with water and sterilized by autoclaving at 15 lbs. pressure for 20 minutes on two successive days. The medium is inoculated by transferring, aseptically, a small portion of mycelium from the test tube cultures 14 days prior to using for inoculum.

An inoculated medium for each of the four soil organisms is prepared as follows: A 14-day old 1000 ml. flask of the corn meal-sand inoculum is used to inoculate 20 10-oz. cups of sterile soil by blending the inoculum and sterile soil for 10 minutes in the cement mixer.

The inoculated medium is then placed in 10 oz. wax treated cold drink cups (20 cups of each organism) and treated as follows: 150 mg. quantity of each candidate fungicide is weighed on the analytical balance and formulated using 10 ml. of acetone and 190 ml. of $H_2O$. If the compound is insoluble in acetone or water, the following formulation is ground in the Waring blender for 3 minutes:

| | Percent |
|---|---|
| Candidate fungicide compound | 50 |
| Montmorillonite clay | 47 |
| Dispersing agent, such as, for example, sodium lignin sulfonate | 2 |
| Wetting agent, such as, for example, sodium dioctyl sulfosuccinate | 1 |

A 50 ml. quantity of each chemical formulation is used to drench 1 cup inoculated with each of the four fungal organisms. Immediately after the cups are drenched, they are placed in polyethylene bags (1 cup per bag) and held at 70° F. for fourteen days.

After ten days, each cup is examined for the presence of fungal growth and each compound rated for percent inhibition of fungal growth.

FUNGICIDE TEST RESULTS
[Percent Effectiveness]

| Active compound concentration, p.p.m. | Fusarium oxysporium | Pythium debaryanum | Rhizoctonia solani | Sclerotium rolfsii |
|---|---|---|---|---|
| 25 | 100 | 80 | 50 | 50 |
| 20[1] | | 80 | | |

[1] The test at 20 p.p.m. concentration was conducted on cotton with complete tolerance to the cotton.

From the above test data, it will be noted that the compounds of the present invention, as exemplified by the activity of the particularly suitable embodiment of Example 1, have a broad range of fungicidal activity. They are effective against *Fusarium oxysporium*, commonly known as cotton wilt; *Pythium debaryanum*, an important disease microorganism which causes seed decay, damping off and storage rot of cotton and many other plants; *Rhizoctonia solani* and *Sclerotium rolfsii*, damping off microorganisms which reduce stands of practically all crops. Also, and as shown by the above data, when 20 p.p.m. active compound was used on cotton, there occurred 80% control of *Pythium debaryanum* with complete tolerance (no adverse effect) to the cotton.

EXAMPLE 2

3,3-dimethyl-2-norbornaneacetyl chloride

A solution of 274 g. of 12.5% phosgene in benzene was added dropwise at ambient temperatures with stirring to a solution of 54 g. of 3,3-dimethyl-2-norbornaneacetic acid and 7.8 g. of dimethylformamide in 150 ml. of benzene. The reaction solution was stirred overnight and then evaporated. The residue was distilled via a short path apparatus to afford 42 g. of pure 3,3-dimethyl-2-norbornaneacetyl chloride as a clear, colorless liquid: B.P. 73–74° (0.3 mm.); ir ($\tau_{max.}$, film) 3.4 (s), 5.5 (s), 6.8 (m), 10.4 (m), 14.1 (m) microns; ms (molecular ion) 200.

EXAMPLE 3

3,3-dimethyl-2-norbornaneacetic acid N,N-dipropyl amide

A solution of 6.0 g. of Example 2 in 10 ml. of ethyl ether was added dropwise with stirring at ambient temperature to a solution of 3.1 g. of dipropylamine and 3.1 g. of triethylamine in 150 ml. of ethyl ether. The reaction was stirred overnight and then filtered. The filtrate was washed with 5% sodium hydroxide, dried over magnesium sulfate and evaporated. The residue was distilled via a short apparatus to afford 5.3 g. of pure 3,3-dimethyl-2-norbornaneacetic acid, N,N-dipropylamide as a clear, colorless liquid: B.P. 123–4° (0.02 mm); ir ($\lambda_{max}$, film) 3.5 (s), 6.2 (s), 6.9 (s), 8.9 (m), microns; nmr ($\delta$, CDCl$_3$) 3.28 and 3.00 (4H, two triplets), 2.4 to 0.75 (27H, multiplet) p.p.m.

EXAMPLE 4

4-(3,3-dimethyl-2-norbornylacetyl) morpholine

The procedure of Example 3 was followed for the reaction of 2.6 g. of morpholine with 6.0 g. of Example 2 and 3.1 g. of triethylamine in 150 ml. of ethyl ether. Obtained following distillation was 4.4 g. of pure 4-(3,3-dimethyl-2-norbornylacetyl)morpholine as a clear, colorless liquid: B.P. 132–135° (0.05 mm); ir ($\lambda_{max}$, film) 3.5 (s), 6.1 (s), 7.1 (s), 9.0 (s) microns; nmr ($\delta$, CDCl$_3$) 3.75 to 3.4 (8H, multiplet) 2.55 to 0.75 (17H, multiplet) p.p.m.

EXAMPLE 5

3,3-dimethyl-2-norbornaneacetic acid N-(4-methylmercaptophenyl)amide

The procedure of Example 3 was followed for the reaction of 4.2 g. of 4-methylmercaptoaniline with 5.7 g. of Example 2 and 3.1 g. of triethylamine in 150 ml. of ethyl ether. The ethereal solution following filtration and basic wash, was mixed with hexane and heated until crystals began to form. The mixture was cooled and the crystals were collected, washed with hexane and dried to afford 4.4 g. of pure 3,3-dimethyl-2-norbornaneacetic acid, N-(4-methylmercaptophenyl)amide as a white solid: M.P. 150–151° C.; ir ($\lambda_{max}$, KBr 2.9 (m), 3.1 (m), 3.4 (s), 6.1 (s), 6.7 (s), 6.8 (m) microns; nmr ($\delta$, CDCl$_3$) 7.9 (1H, broad), 7.6 to 7.3 (4H, two doublets), 2.4 (3H, singlets), 2.4 to 0.7 (17H, multiplet) p.p.m.

EXAMPLE 6

3,3-dimethyl-2-norbornaneacetic acid 2,6-dichloro-4-nitrophenyl ester

A solution of 8.3 g. of 2,6-dichloro-4-nitrophenol, 4.1 g. of triethyl amine and 8.0 g. of Example 2 in 120 ml. of toluene was heated to reflux for 4 hours. The mixture was cooled and filtered, and the filtrate was washed with 5% sodium hydroxide, dried over magnesium sulfate and evaporated. The residue crystallized on standing to afford 16.5 g. of pure 3,3-dimethyl-2-norbornaneacetic acid, 2,6-dichloro-4-nitrophenyl ester as a white solid: M.P. 61–62° C., ir ($\lambda_{max}$, film) 3.4 (s), 5.6 (s), 6.6 (s), 7.5 (s), 9.3 (s), 12.2 (s) microns; nmr ($\delta$,CDCl$_3$) 8.2 (2H, singlet), 2.8 to 0.9 (17H, multiplet) p.p.m.

EXAMPLE 7

N,N,N-trimethylammonium, 3,3-dimethyl-2-norbornylacetate

A solution of 9.1 g. of Example 1 in 100 ml. of methanol and 14.8 g. of 25% trimethylamine in methanol was stirred at ambient temperature for one hour and then evaporated under vacuum to remove methanol and excess trimethylamine. The remaining viscous oily residue weighed 16 g. and analyzed correctly for N,N,N-trimethyl - ammonium, 3,3 - diethyl-2-norbornylacetate: ir ($\lambda_{max}$, film) 2.9 to 4.4 (broad), 3.5 (s), 5.9 (s), 6.8 (m) microns.

EXAMPLE 8

Copper bis-(3,3-dimethyl-2-norbornylacetate)

A solution of 4.0 g. of cupric sulfate heptahydrate in 25 ml. of water was added to a solution of 5.9 g. of Example 1 and 1.8 g. of potassium hydroxide in 80 ml. of water. After stirring for one hour, the separated solid was collected, washed with water and a small amount of methanol and dried. Obtained was 5.7 g. of pure copper bis-(3,3-dimethyl-2-norbornylacetate) as a light blue solid: M.P. >250° C., ir ($\lambda_{max}$, KBr) 2.9 (m), 3.4 (s), 6.4 (s), 7.2 (s) microns.

The following compounds of Examples 9–34 were prepared according to the procedures of Examples 3–8 using either Example 1 or Example 2 and an appropriate amine, aniline, alcohol or inorganic salt as starting materials.

EXAMPLE 9

3,3-dimethyl-2-norbornaneacetic acid, 3-chlorophenyl amide: M.P. 141–142° C.

EXAMPLE 10

3,3-dimethyl-2-norbornaneacetic acid, 4-bromophenyl amide: M.P. 177–178° C.

EXAMPLE 11

3,3-dimethyl - 2 - norbornaneacetic acid, 3,4-dichlorophenyl amide: M.P. 164–165° C.

EXAMPLE 12

3,3-dimethyl-2-norbornaneacetic acid, N,N-dimethyl amide: B.P. 183–185° (0.15 mm.).

EXAMPLE 13

3,3-dimethyl-2-norbornaneacetic acid, 2-(N,N-dimethylamino) ethyl ester: B.P. 114–116° (0.2 mm.).

EXAMPLE 14

3,3-dimethyl-2-norbornaneacetic acid, N-butyl amide.

EXAMPLE 15

3,3-dimethyl-2-norbornaneacetic acid, N-phenyl amide: M.P. 162–163° C.

EXAMPLE 16

3,3-dimethyl-2-norbornaneacetic acid, 2-methyl-4-chlorophenyl amide: M.P. 138–139° C.

EXAMPLE 17

3,3-dimethyl-2-norbornaneacetic acid, 2-chloro-4-methylphenyl amide: M.P. 133–134° C.

EXAMPLE 18

3,3-dimethyl-2-norbornaneacetic acid, 3-trifluormethylphenyl amide: M.P. 148–150° C.

EXAMPLE 19

3,3-dimethyl-2-norbornaneacetic acid, triethylammonium salt.

EXAMPLE 20

3,3-dimethyl-2-norbornaneacetic acid, zinc salt: M.P. 199–202° C.

EXAMPLE 21

3,3-dimethyl-2-norbornaneacetic acid, sodium salt: M.P. >250° C.

EXAMPLE 22

3,3-dimethyl-2-norbornaneacetic acid amide: M.P. 83–100° C.

EXAMPLE 23

3,3-dimethyl-2-norbornaneacetic acid, tertbutyl ester: clear, colorless liquid.

EXAMPLE 24

3,3-dimethyl-2-norbornanethioacetic acid, ethyl ester: clear, colorless liquid.

EXAMPLE 25

3,3-dimethyl-2-norbornaneacetic acid, 2-aminophenyl amide: M.P. 181–185° C.

EXAMPLE 26

3,3-dimethyl-2-norbornaneacetic acid, 2-methoxyphenyl amide.

EXAMPLE 27

3,3-dimethyl-2-norbornaneacetic acid, 4-chlorophenyl amide: M.P. 174–176° C.

EXAMPLE 28

3,3-dimethyl-2-norbornaneacetic acid, 2-bromophenyl amide: M.P. 119–121° C.

EXAMPLE 29

3,3-dimethyl-2-norbornaneacetic acid, 3-methylphenyl amide: M.P. 123–125° C.

EXAMPLE 30

3,3-dimethyl-2-norbornaneacetic acid, 4-methylphenyl amide: M.P. 152–153° C.

EXAMPLE 31

3,3-dimethyl-2-norbornaneacetic acid, 3-methylmercaptophenyl amide: M.P. 129–131° C.

EXAMPLE 32

3,3-dimethyl-2-norbornaneacetic acid, 3-nitrophenyl amide: M.P. 118–121° C.

EXAMPLE 33

3,3-dimethyl-2-norbornaneacetic acid, 3-methoxyphenyl amide: M.P. 93–95° C.

EXAMPLE 34

3,3-dimethyl-2-norbornaneacetic acid, 2-methylphenyl amide: M.P. 133–135° C.

The following compounds having fungicidal activity in accordance with this invention were obtained or prepared as follows:

EXAMPLE 35

3,3-dimethyl-2-norbornaneacetaldehyde

This compound is well known and was obtained from a commercial source.

EXAMPLE 36

3,3-dimethyl-2-norbornaneethanol

A 120 g. solution of 70% bis (2-methoxyethoxy) aluminum hydride in benzene was mixed with 100 ml. of benzene and added dropwise to a solution of 66.4 g. of Example 35 in 600 ml. of benzene so as to control the exotherm at 40° C. Following a 3 hour stir at ambient temperature, a 20% sulfuric acid solution was added dropwise to achieve a pH of 4. The benzene layer was separated, washed with water, dried over magnesium sulfate and concentrated. The remaining liquid was distilled to afford 65 g. of pure 3,3-dimethyl-2-norbornaneethanol: B.P. 75–77° C. (0.1 mm.); ir ($\lambda_{max.}$, film) 3.1 (s), 3.5 (s), 6.9 (s), 9.5 (s), 9.8 (s) microns; nmr ($\delta$, CDCl$_3$) 3.55 (2H, multiplet), 2.95 (1H, singlet), 2.1 to 0.8 (17H, multiplet) p.p.m.

Fungicide test results (percent effectiveness)

The following compounds were tested and found effective against *Pythium debaryanum* (PD), *Rhizoctonia solani* (RS) and *Sclerotium rolfsii* (SR) at the application rate of 25 p.p.m.

| Compound | PD | RS | SR |
| --- | --- | --- | --- |
| Example: | | | |
| 3 | 80 | 40 | 40 |
| 4 | 30 | 40 | 40 |
| 5 | 90 | 70 | 70 |
| 6 | 100 | 30 | 30 |
| 7 | 70 | 40 | 40 |
| 8 | 80 | 80 | 80 |
| 9 | 90 | 90 | 90 |
| 10 | 10 | 60 | 60 |
| 11 | 30 | 80 | 80 |
| 12 | 10 | 20 | 20 |
| 13 | 10 | 20 | 20 |
| 14 | 10 | 20 | 20 |
| 15 | 10 | 100 | 100 |
| 16 | 10 | 30 | 30 |
| 17 | 10 | 30 | 30 |
| 18 | 10 | 20 | 20 |
| 19 | 50 | 50 | 50 |
| 20 | 10 | 70 | 70 |
| 21 | 10 | 40 | 40 |
| 35 | 20 | 60 | 60 |
| 36 | 70 | 70 | 70 |

From the above test data, it will be noted that the compounds of the present invention have a broad range of fungicidal activity. They are effective against *Pythium debaryanum*, an important disease microorganism which causes seed decay, damping off and storage rot of cotton and many other plants and plant products (e.g., fruits and vegetables); *Rhizoctonia solani* and *Sclerotium rolfsii*, damping off microorganisms which reduce stands of practically all crops. Also as indicated by the broad range of fungicidal activity the compounds of the present invention would be expected to be effective against other low order plants and fungi, such as, for example *Fusarium oxysporium*, and therefore be useful as bacteriocides, slimicides and algecides.

The compounds of this invention exhibit considerable fungicidal activity and are disclosed for use in various ways to achieve control of fungus. They can be applied per se, as solids or in vaporized form, but are preferably applied as the toxic components in fungicidal compositions of the compound and a carrier. The compositions can be applied as dusts, as liquid sprays or as gas-propelled sprayed and can contain, in addition to a carrier additives such as emulsifying agents, wetting agents, binding agents, gases compressed to the liquid state, odorants, stabilizers and the like. A wide variety of liquid and solid carriers can be used in the fungicidal compositions. Nonlimiting examples of liquid carriers include water; organic solvents such as alcohols, ketones, amides, and esters; mineral oils such as kerosene, light oils, and medium oils, and vegetable oils such as cottonseed oil. Nonlimiting examples of solid carriers include talc, bentonite, diatomaceous earth, pyrophylite, fullers earth, gypsum, flours derived from cottonseeds and nut shells, and various natural and synthetic clays.

The amount of the compounds of this invention utilized in fungicidal compositions will vary rather widely. It depends to some extent upon the type of composition in which the material is being used, the nature of the condition to be controlled, and the method of application (i.e., spraying, dusting, etc.). In the ultimate fungicidal composition, as applied in the field, fungicide concentrations as low as 0.0001 weight percent of the total composition can be used. In general, compositions, as applied, containing about 0.05 weight percent fungicide in either liquid or solid carrier give excellent results. In some cases, however, stronger dosages up to about 10 weight percent may be required.

In practice, fungicidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of fungicide desired for application. Other concentrates can be solutions that can be later diluted, e.g., with kerosene, thus, it is within the contemplation of this invention to provide fungicidal compositions containing up to about 80 percent, by weight of the composition, of a fungicidal compound of this invention.

Accordingly, depending upon whether it is ready for application or it is in concentrated form the contemplated fungicidal compositions contain between about 0.0001 percent and about 80 percent, by weight of the composition, of a fungicidal compound of this invention, and a carrier, liquid or solid, as defined hereinbefore.

Although the present invention has been described with preferred embodiments, it is to be understood that modifications and variations may be resorted to without departing from the spirit and scope of the invention, as those skilled in the art will readily understand.

What is claimed is:

1. A method for combatting fungi which comprises contacting the fungi with a fungicidally effective amount of a compound selected from the group consisting of (1) a compound of the formula:

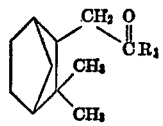

and (2) a compound of the formula:

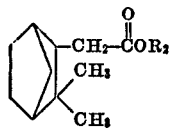

wherein $R_1$ is and $R_2$ is $Li^+$ $Na^+$, $K^+$, or monovalent ammonium ions of the formula: $NR_3R_4R_5R_6$ wherein $R_3$, $R_4$, $R_5$ and $R_6$ are hydrogen or alkyl of 1–6 carbon atoms.

2. The method of claim 1, wherein said compound is 3,3-dimethyl-2-norbornaneacetic acid.

3. The method of claim 1, wherein said compound is N,N,N-trimethylammonium, 3,3 - dimethyl-2-norbornyl acetate.

4. The method of claim 1 wherein said compound is 3,3-dimethyl-2-norbornaneacetic acid, triethylammonium salt.

5. The method of claim 1, wherein said compound is 3,3-dimethyl-2-norbornaneacetic acid, sodium salt.

6. A composition for combatting fungi which comprises a solid carrier and a fungicidally effective amount of a compound selected from the group consisting of (1) a compound of the formula:

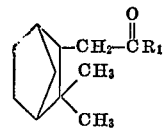

and (2) a compound of the formula:

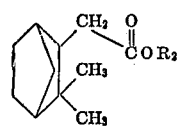

wherein $R_1$ is and $R_2$ is $Li^+$, $Na^+$, and $K^+$, $Ca^{++}$, $Ba^{++}$, or monovalent ammonium ions of the formula:

wherein $R_3$, $R_4$, $R_5$ and $R_6$ are hydrogen or alkyl of 1–6 carbon atoms.

7. The composition of claim 6, wherein said compound is 3,3-dimethyl-2-norbornaneacetic acid.

8. The composition of claim 6 wherein said compound is N,N,N-trimethylammonium, 3,3-dimethyl-2-norbornylacetate.

9. The composition of claim 6 wherein said compound is 3,3-dimethyl-2-norbornaneacetic acid, triethylammonium salt.

10. The composition of claim 6 wherein said compound is 3,3-dimethyl-2-norbornaneacetic acid, sodium salt.

References Cited

UNITED STATES PATENTS

| | | | |
|---|---|---|---|
| 2,839,553 | 6/1958 | Soloway | 260—514 GX |
| 3,008,982 | 11/1961 | Schmerling et al. | 260—514 GX |

FOREIGN PATENTS

| | | |
|---|---|---|
| 923,918 | 2/1955 | Germany. |
| 1,117,244 | 11/1961 | Germany. |

OTHER REFERENCES

Suga et al., Aust. J. Chem., 20 (1967), pp. 2033–36.

JEROME D. GOLDBERG, Primary Examiner

A. J. ROBINSON, Assistant Examiner

U.S. Cl. X.R.

260—247, 438.1, 557; 424—248, 288, 289, 293, 294, 295, 299, 305, 311, 315, 317, 320, 324, 331, 333, 335

PO-1050
(5/69)

UNITED STATES PATENT OFFICE
CERTIFICATE OF CORRECTION

Patent No. 3,796,803                Dated  March 12, 1974

Inventor(s)  Jerry G. Strong

It is certified that error appears in the above-identified patent and that said Letters Patent are hereby corrected as shown below:

Col. 3, line 57 "or" should be --of--.

Col. 8, line 66 "sprayed" should be --sprays--.

Col. 9, line 61, Claim 1 "$R_1$ is and" should be --$R_1$ is hydroxy and--.

Col. 9, line 61, Claim 1  after "$K^+$" insert --$Ca^{++}$, $Ba^{++}$--.

Col. 10, line 27, Claim 6  "$R_1$ is and" should be --$R_1$ is hydroxy and--.

Col. 10, line 27, Claim 6  after "$Na^+$" delete --and--.

Signed and sealed this 13th day of August 1974.

(SEAL)
Attest:

McCOY M. GIBSON, JR.
Attesting Officer

C. MARSHALL DANN
Commissioner of Patents